United States Patent [19]

Bates et al.

[11] Patent Number: 4,817,049

[45] Date of Patent: Mar. 28, 1989

[54] DATA LOGGING DEVICE WITH SEPARATED DATA MEMORY UNIT HAVING INTERNAL POWER SOURCE AND TRANSDUCER INTERFACE UNIT FOR CONNECTION TO EXTERNAL TRANSDUCERS

[75] Inventors: Alexander J. Bates, Cambridge, England; John R. Wells, Belmont, Mass.; Ronald A. Shapiro, Edgecomb, Me.; Richard L. Tenney, Belmont, Mass.

[73] Assignee: Datapaq, Ltd., England

[21] Appl. No.: 855,447

[22] Filed: Apr. 24, 1986

[30] Foreign Application Priority Data

Apr. 24, 1985 [GB] United Kingdom ................. 8510425

[51] Int. Cl.[4] .......................... G06F 15/00; G06F 3/00

[52] U.S. Cl. .................................... 364/900; 364/422; 73/151

[58] Field of Search ... 364/200 MS File, 900 MS File, 364/550, 554, 487, 422; 73/151, 152

[56] References Cited

U.S. PATENT DOCUMENTS

| | | | |
|---|---|---|---|
| 4,027,289 | 5/1977 | Toman | 364/900 |
| 4,104,725 | 8/1978 | Rose et al. | 364/487 |
| 4,128,893 | 12/1978 | Johnson et al. | 364/900 |
| 4,216,536 | 8/1980 | More | 73/152 X |
| 4,307,455 | 12/1981 | Juhasz et al. | 364/900 |
| 4,400,783 | 8/1983 | Locke, Jr. et al. | 364/550 |
| 4,454,577 | 6/1984 | Constantini et al. | 364/200 |
| 4,507,740 | 3/1985 | Star et al. | 364/487 |
| 4,523,087 | 6/1985 | Benton | 235/379 |
| 4,525,624 | 6/1985 | Pontefract | 364/189 |
| 4,549,264 | 10/1985 | Carroll et al. | 364/406 |
| 4,553,223 | 11/1985 | Bouhelier et al. | 364/900 |
| 4,562,545 | 12/1985 | Hasegawa | 364/550 |
| 4,625,276 | 11/1986 | Benton et al. | 364/406 |
| 4,626,996 | 12/1986 | Arlott | 364/550 |
| 4,658,357 | 4/1987 | Carroll et al. | 364/406 |
| 4,672,555 | 6/1987 | Hart et al. | 364/483 |
| 4,674,060 | 6/1987 | Larkin et al. | 364/575 |
| 4,695,965 | 9/1987 | Fujita et al. | 364/550 |
| 4,718,011 | 1/1988 | Patterson, Jr. | 364/422 |
| 4,740,897 | 4/1988 | Delatorre et al. | 364/422 |

*Primary Examiner*—Archie E. Williams Jr.
*Assistant Examiner*—Thomas C. Lee
*Attorney, Agent, or Firm*—Robbins & Laramie

[57] ABSTRACT

A data logging device has a data memory unit (11) and a transducer interface unit (1). The data memory unit has an internal power source (12), an integrated circuit memory component (23) for storing data under the control of a microprocessor (18) in the memory unit, light emitting diodes (14, 21) for indicating the amount of data stored in the memory component and the power source state. A connector component (19) connects the memory component to receive data from the transducer interface unit. The transducer interface unit (1) has a plurality of ports (2) for connection of remote transducers and an analog to digital converter (5) for translating signals received from the ports into data signals which can be transferred to the memory component in the data memory unit through a connector component (9) connected to the connector component (19) of the data memory unit.

6 Claims, 7 Drawing Sheets

DATA LOGGING DEVICE WITH SEPARATED DATA MEMORY UNIT HAVING INTERNAL POWER SOURCE AND TRANSDUCER INTERFACE UNIT FOR CONNECTION TO EXTERNAL TRANSDUCERS

BACKGROUND OF THE INVENTION

The present invention relates to a data logging device for monitoring and recording information from a plurality of remote transducers to which the data logging device is attached. More particularly the invention relates to such a device that can record details of processing conditions such as temperature, pressure, humidity, specular gloss, thickness etc. in a variety of different manufacturing processes, but the invention is not limited to devices restricted to such use and may be used for example in the measurement of strain, stress etc. on bridges or other structures.

The accurate measurement and recording of conditions during a manufacturing process is a requirement in many industries and, historically this need has been served by systems based on clockwork or electromechanical chart recorders or simple cassette recorders. These systems have posed several problems. Generally these devices are "dumb" recorders that are quite large and fragile and require frequent attention to reload batteries and charts or for rewinding. Moreover in many cases the data so collected does not lend itself to easy analysis particularly when a specific event needs to be analysed in detail.

More recently, portable, battery operated devices using microprocessors have been proposed. However, such devices are often complex to use, requiring operation of switches to set particular functions and parameters and thus an understanding of the device that may be beyond the ability of an unskilled or semi-skilled person. Moreover such devices are often task-specific and do not lend themselves to use in a variety of different situations.

Accordingly there is a need for a portable data logging unit that is simple to use, but which, at the same time, is capable of monitoring and storing large amounts of data for subsequent study.

SUMMARY OF THE INVENTION

According to the present invention therefore a data logging device comprises a data memory unit and a transducer interface unit; the data memory unit having an internal power source, an integrated circuit memory component for storing data under the control of a microprocessor in the memory unit, an indicator indicating the amount of data stored in the memory component and the battery state, and a connector component for connecting the memory component to receive data from the transducer interface unit; the transducer interface unit having a plurality of ports for connection of remote transducers and means for translating signals received from the ports into data signals which can be transferred to the memory component in the data memory unit through a connector component connected to the connector component of the data memory unit; the data memory unit and the transducer interface unit having interengaging surfaces in which the respective connector components are located assymetrically so that the data memory unit and the transducer interface unit can be coupled to form an integral unit in only one relative orientation with the interengaging surfaces of the units coupled together.

Preferably, the interengaging surfaces comprise, respectively, a recessed surface in one end face of one of the units and a complementary projecting surface in the other of the units.

The device also preferably includes a computer interface unit by means of which data recorded in the data memory unit can, after completion of the recording process, be transferred to a computer for analysis, printing of results etc.

Preferably, the power source in the data memory unit comprises a rechargeable battery, but alternatively the power source may be a replaceable battery, in which case the data memory unit comprises a suitable housing part and attachable/detachable terminals.

The data memory unit and the transducer interface are advantageously configured so that the operation of coupling them together initializes the transducer interface to commence data acquisition and transfer to the memory unit.

The data memory unit may be programmed so as to identify the transducer interface to which it is connected and to perform simple statistical functions for later use, and is programmed to take readings from the transducer interface at regular predetermined intervals or as determined under program control. A plurality of light emitting diodes (LED's), suitably colour coded, indicate such information as "good connect" (between the data memory unit and computer interface), "memory full", and "low battery".

DESCRIPTION OF THE DRAWING

One example of a device constructed in accordance with the present invention will now be described with reference to the accompanying drawings in which.

DESCRIPTION OF THE INVENTION

Figure 1A:
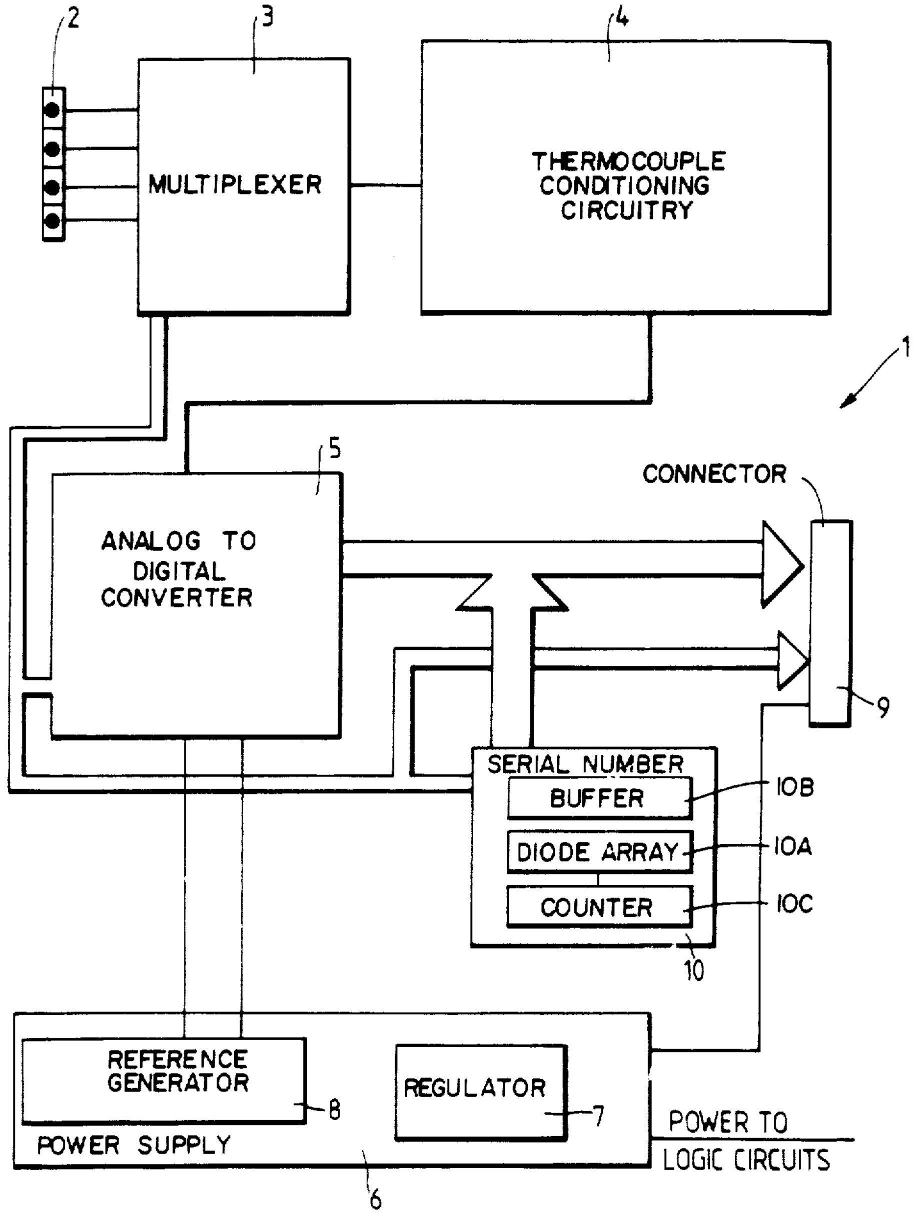
FIG. 1A is a block diagram showing internal transducer interface components.
Figure 1B:
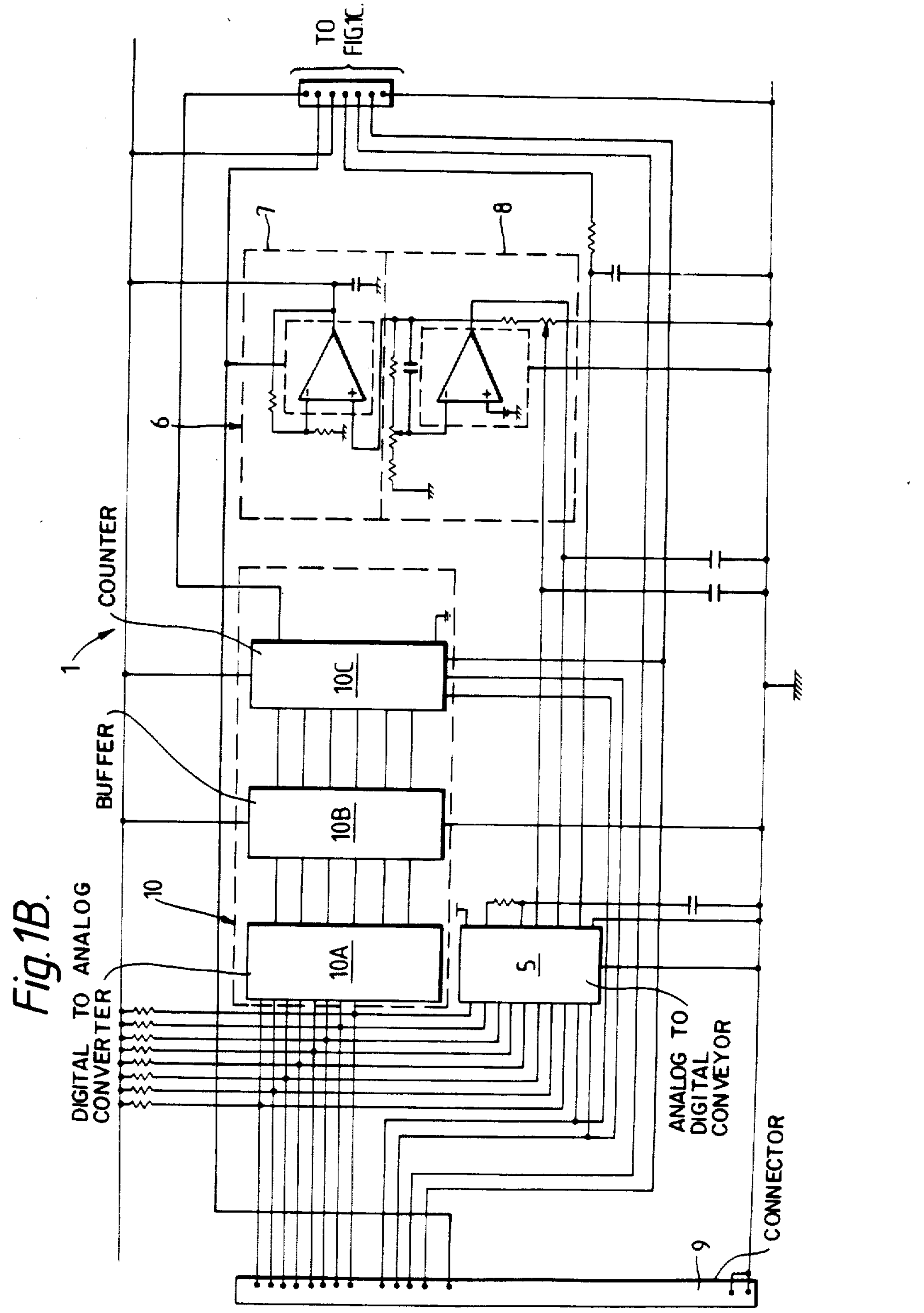
FIGS. 1B and 1C are circuit diagrams corresponding to FIG. 1A.
Figure 1C:
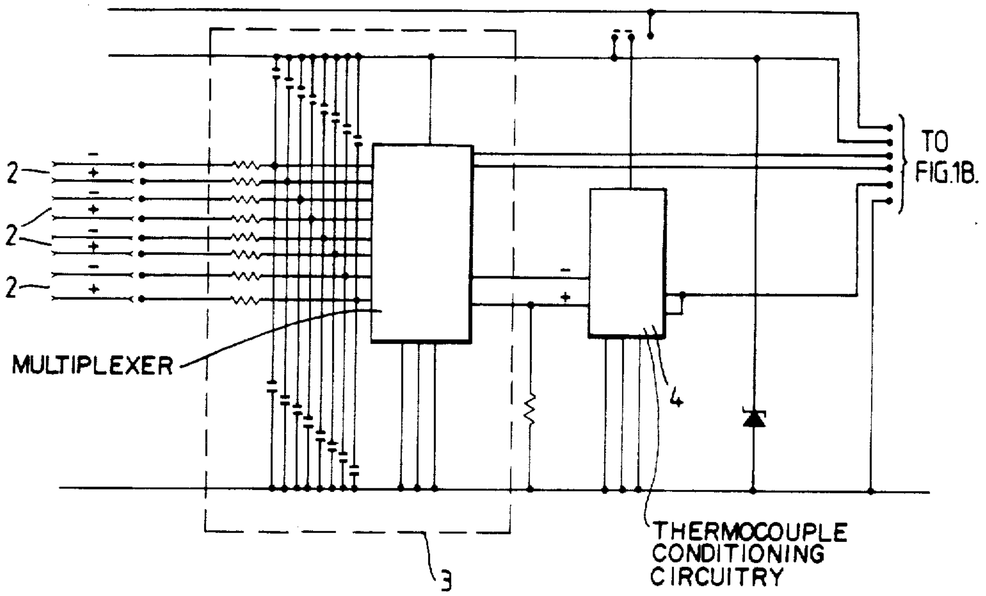
Figure 2A:
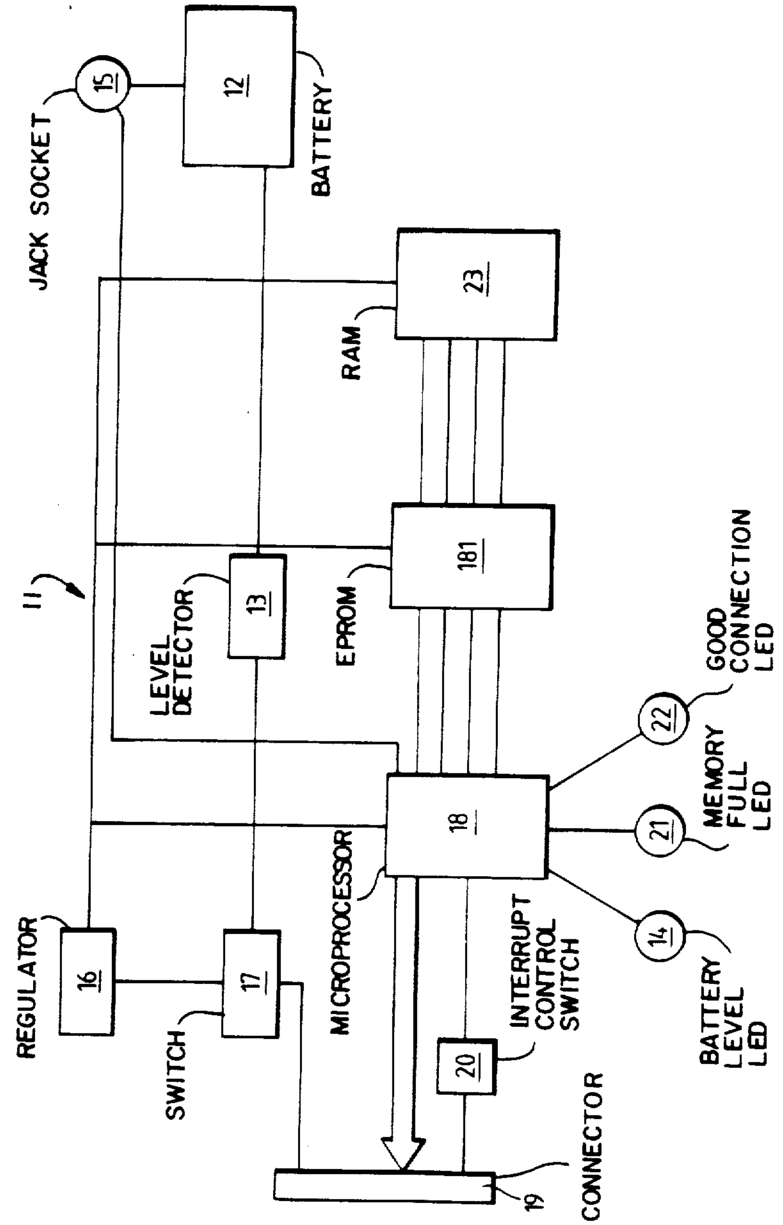
FIG. 2A is a block diagram showing data memory unit internal components.
Figure 2B:
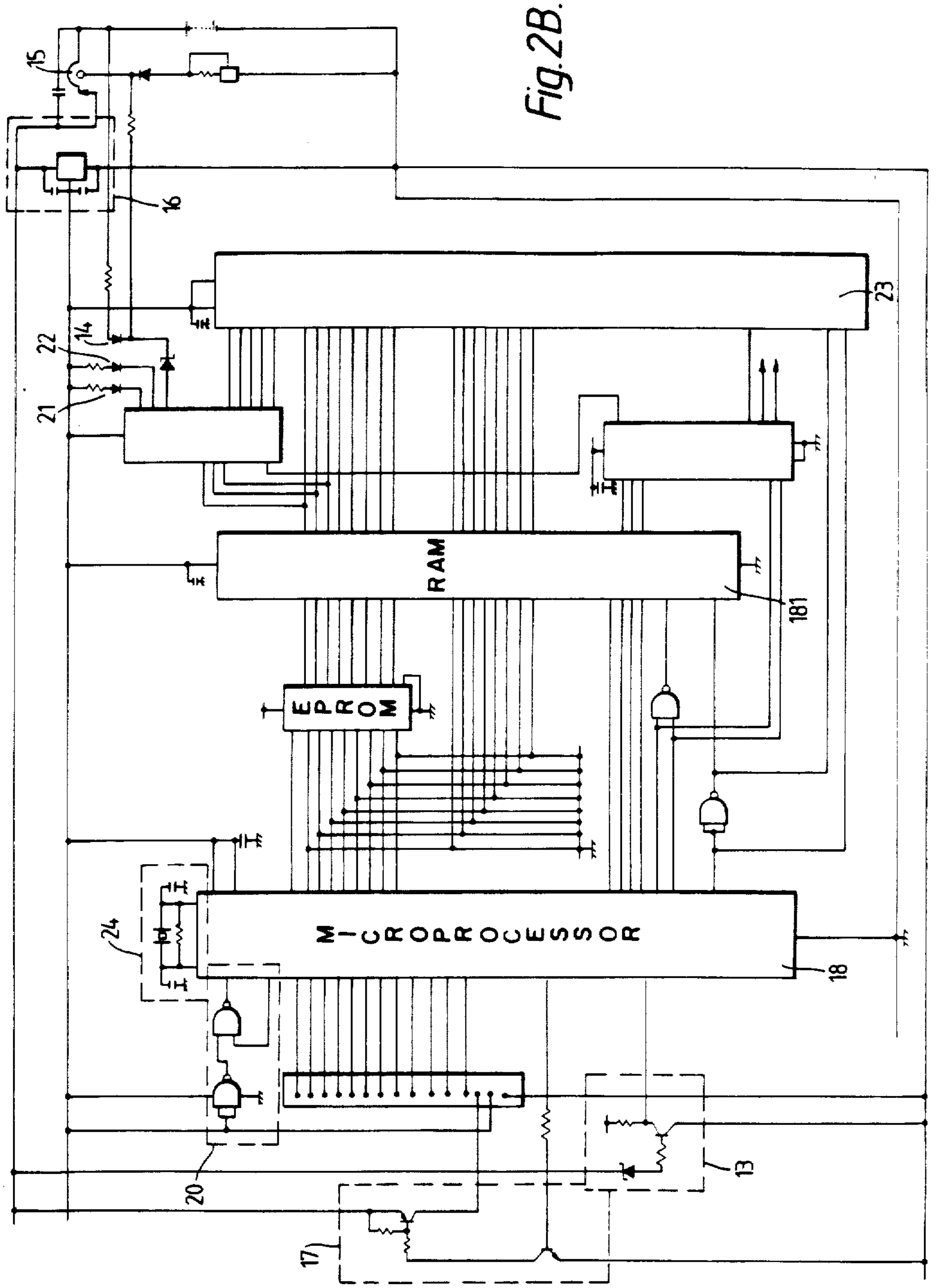
FIG. 2B is a circuit diagram corresponding to FIG. 2A.
Figure 3A:
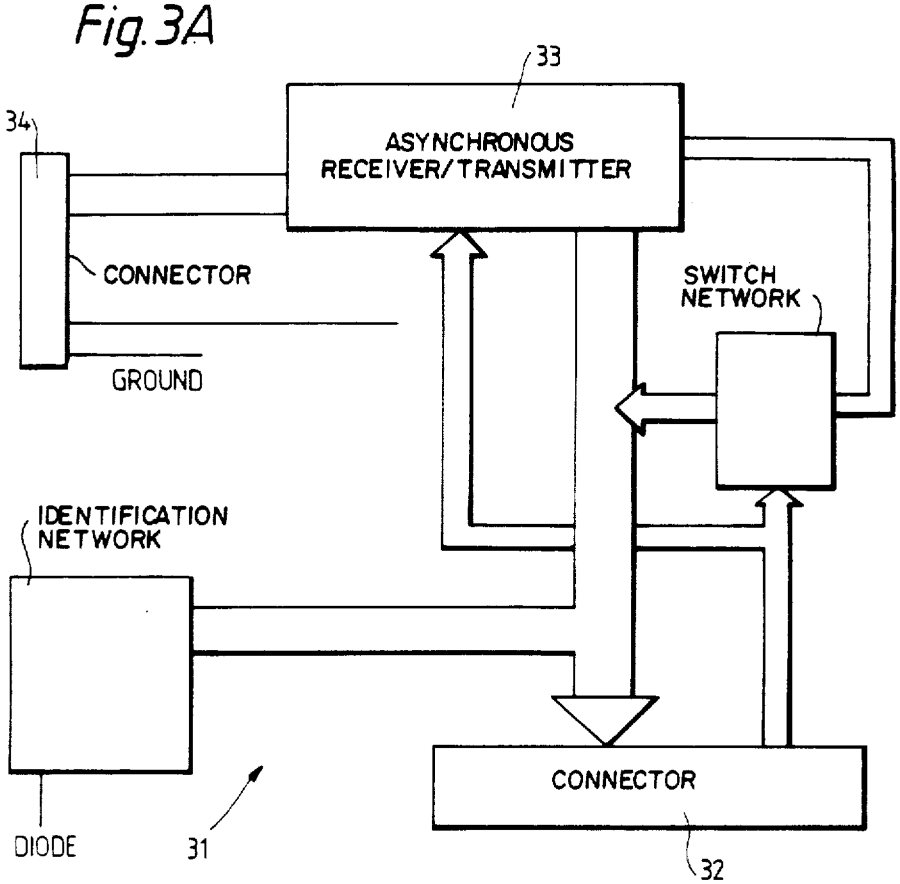
FIG. 3A is a block diagram showing computer interface internal components.
Figure 4:
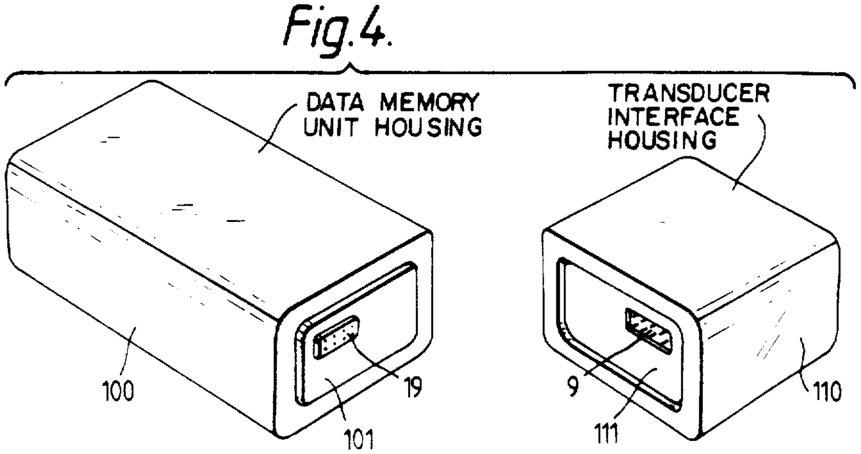
FIG. 4 is a diagrammatic general view of the data memory unit and transducer interface.
Figure 3B:
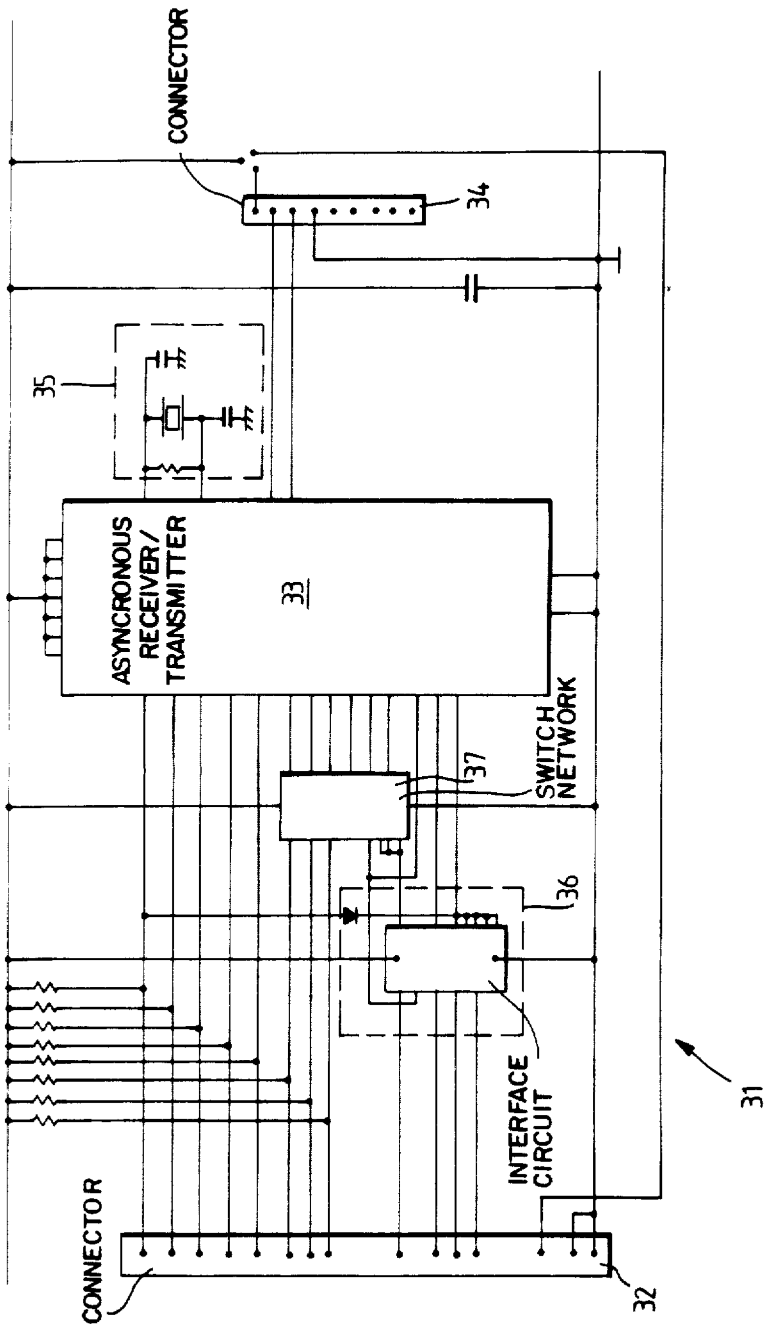
FIG. 3B is a circuit diagram corresponding to FIG. 3A.

The transducer interface 1 has four type K thermocouple jack socket ports 2 for the connection of up to four thermocouple transducers (not shown) and voltage signals from the transducers are fed through a multiplexer 3 and, after appropriate compensation by suitable thermocouple conditioning circuitry 4 (which comprises an integral amplifier and cold junction compensation on an integrated circuit chip), are fed to an 8-bit (in the present example) analog-to-digital converter 5. The transducer interface includes power supply circuitry 6 which has a 5 volt regulator 7 and precision reference voltage generator 8, being fed with "raw" power via standard 15 pin "D" connector 9 at 7.2 volts. The "D" connector also transfers data from the transducer interface 1 to the data memory unit 11. The specific "serial number" 10 is electronically contained in a diode array, buffer and counter circuit 10A, 10B, 10C.

The data memory unit 11 contains a rechargeable battery 12 of nickel cadmium type which supplies power at 7.2 volts to the remaining components in the data memory unit and, when connected, to the transducer interface 1. The battery 12 is rechargeable through a jack socket 15, use of which causes the data held in the data memory unit to be cleared and the unit reset. A low battery level detector 13 is arranged to monitor battery level and, through microprocessor 18, light LED 14 if battery level drops below a predetermined threshold value. The 7.2 volts from the battery 12 feeds both a 5 volt regulator 16 to feed all the logic components of the data memory unit, and an electronic switch 17 which feeds power to the transducer interface 1 and the microprocessor 18. The microprocessor 18 is arranged to receive signals from the transducer interface 1 via further "D" type connector 19 mating with that of the transducer interface and also senses proper connection with the transducer interface through an interrupt control switch 20 which operates to inhibit the interrupt cycle of the microprocessor 18 after the transducer interface 1 and data memory unit 11 have been connected for a given interval of time, in this example approximately 2½ seconds. This serves to ensure both intentional and secure connection. Signals fed to the microprocessor 18 are processed to provide status indication on LED's 21 (memory full) and 22 (good connect) and for storage in an 8 kilobyte RAM component 23. An EPROM 181 is connected to the microprocessor 18 and RAM 23 to provide all control functions, such for example as sampling frequency, by pre-programming the EPROM appropriately with codes for data memory unit operations.

Coupling together the transducer interface and data memory unit initiates data acquisition, after the short pause referred to above, under control of the microprocessor 18 and disconnection ends acquisition. By this means and by the construction of the endfaces 101,111 of the data memory unit and transducer interface housings 100,110 so as to mount the "D" type connectors assymetrically the device can be used without any detailed operational knowledge being necessary. The connection of the transducer interface and data memory unit is thus, effectively "idiot proof". The transducer interface does not need to be removed from its coupling with the transducers between measurements, and the data memory unit is simply uncoupled from the transducer interface and connected with the computer interface to transfer information to a computer for analysis.

The computer interface 31 comprises a "D" type connector 32 for connection with that of the data memory unit 11 and after suitable manipulation in the circuitry of the computer interface (which includes a universal asynchronous receiver/transmitter (UART) 33), to establish compatability of the computer interface with the data memory unit 11, data is transferred through a suitable jack plug 34, under computer control, to RAM in the connected computer. The UART 33 has its timing accurately controlled by a quartz crystal oscillator 35. In the present example the computer interface is powered from the computer, but in an alternative it may be powered from the data memory unit.

The transducer interface described above is specifically designed for sensing temperature values, but transducer interfaces for sensing different physical conditions can be provided, each of them being connectable to a standard data memory unit for data storage, the signals from the different transducer interfaces being in the same standard digital form. The number of ports can be arranged to suit specific applications.

In use the microprocessor in the data memory unit runs continuously. When the data memory unit is reset, either by recharging the battery or under software control, (ie. cleared of previous data) the microprocessor goes into a "wait" state which consumes very little power. The data memory unit can be left on the shelf for long periods and still be ready for use when required. Plugging the data memory unit into a transducer interface causes the microprocessor to "wake-up". First, the data memory unit reads the transducer interface code and interprets the information contained in it. The code may indicate the temperature range, the number of channels and the resolution. Not all of the information is used by the data memory during data retrieval; some being used in subsequent processing by the host computer. Assuming a valid transducer interface code is received the data memory unit will start sampling. The frequency of sampling is pre-programmed into the data memory unit EPROM 181 software. EPROM standard sampling intervals are 0.1s, 0.5s, 1s, 5s and 10s, although any value up to 999s may be supplied if the application requires. In the case of a 5s data memory connected to a transducer interface, every 5s the data memory unit switches power to the transducer interface, waits for the circuit to settle and takes a set of 16 readings from each channel. Sixteen readings are taken instead of one to allow the microprocessor to do some statistical manipulation. Each set of sixteen readings is processed to extract the Maximum Likelihood Estimator of the transducer output. This process, a form of digital filtering, removes the effects of random electrical noise picked up by the thermocouple cables. The result is that smoother and more accurate readings are obtained. The data memory unit stores the best estimate value for each channel, switches off power to the transducer interface and waits until the next sample is due. The data memory unit calculates time intervals from an accurate Quartz Crystal controlled reference oscillator 24. The process of switching off the transducer interface when not required provides considerable savings in power consumption. The analogue devices used in the transducer interface consume large amounts of power compared to the all-digital data memory unit circuit. Battery life of the data memory unit is thus considerably increased.

The process of storing values continues until the data memory unit memory 23 is full. If the transducer interface is disconnected before the memory is filled the data memory unit marks time by continuing to store dummy readings every sampling interval. The transducer interface could in fact be reconnected, and as long as there is vacant memory, the data memory unit will resume taking and storing temperature data. Unless specifically programmed to do so, the data memory unit will not allow a different transducer interface to be connected in this way. It is thus impossible for a data memory unit to be accidentally loaded with data from several different transducer interfaces. Of course, a data memory unit can be loaded with data from one transducer interface, reset and then loaded with data from another.

When the data memory unit internal memory 23 is full the data memory unit keeps counting elapsed time from the "memory full" condition so that the absolute real time of date measurement can be evaluated. Data in the data memory unit memory may be transferred to a host computer by means of the computer interface. The computer interface is equipped with a modular socket, identical to that used on the transducer interface, and the communication process is initiated by simply plugging in the data memory unit. The computer interface is a serial interface which allows two-way communication between the data memory unit and the computer. The data memory unit reads a dummy serial number from an interface circuit 36 and then transfers data, via a switch network 37 and UART 33, to the computer, the data still remains also in the data memory unit. The data memory unit data may be erased, freeing it for reuse, under software control from the host computer. As noted previously, the data memory unit keeps a count of how much time has elapsed since the transducer interface and data memory unit were first plugged together. The host computer may use this data, together with the time that that data was transferred (obtained from the computer's internal real-time clock) to calculate back to the exact real time to which the temperature data relates. Data is thus time and date stamped as it is transferred from the data memory unit.

The data memory unit and transducer interface collect data from the transducer attached to the article under test. In the case of temperature readings this might be an automobile body, a beer can or a section of aluminium extrusion. Such products are processed in conveying ovens; long tunnel shaped ovens through which the products are carried by a conveyor. The transducer interface and data memory unit can travel with the produce under test, linked to the temperature probes by short, e.g. 1–3 m long, temperature cables. The transducer interface and data memory unit may be protected from the high temperature inside the oven by a thermal Barrier consisting of a metal box, lined with high performance insulation and having a central cavity in which the transducer interface and data memory unit sit.

We claim:

1. A portable data logging device for connection to remote signal producing transducers comprising:

a data memory unit and a separable transducer interface unit;

said data memory unit having an internal power source for producing power at a selected level, a microprocessor coupled to the power source and powered thereby, an integrated circuit memory component coupled to the microprocessor for storing data in various amounts therein means coupled to the power source and the memory component for indicating the amount of data stored in said memory component and the level of said power source, and a first connector component coupled to said memory component to receive data from said transducer interface unit when connected thereto;

said transducer interface unit having a plurality of ports for connection to said remote signal producing transducers, a second connector component for connection with the first connector component of the data memory unit, and means coupled between the ports and the second connector component for translating signals produced by said transducers into data signals for transfer to said memory component in said data memory unit through said second connector component when connected to said first connector component of said data memory unit.

2. A device according to claim 1, wherein said data memory unit and said transducer interface unit have interengaging surfaces in which said respective connector components are located asymetrically so that said data memory unit and said transducer interface engage to form an integral unit in only one relative orientation.

3. A device according to claim 2, wherein said interengaging surfaces comprise, respectively, a recessed surface in one end face of one of said units and a complementary projecting surface in said other of said units.

4. A device according to claim 1, further including a computer interface unit for connecting the data memory unit with a computer and for transferring data stored in the data memory unit to said computer.

5. A device according to claim 1, comprising means for initializing said transducer interface to commence data acquisition and data transfer to said memory unit upon engaging the data memory unit and the transducer interface unit.

6. A device according to claim 1, wherein said transducer interface includes means for holding a unique identifying data code and wherein said data memory unit includes means for reading said identifying data code and storing it in memory.

* * * * *